(12) United States Patent
Hotani

(10) Patent No.: US 7,238,226 B2
(45) Date of Patent: Jul. 3, 2007

(54) DEFOAMING APPARATUS

(75) Inventor: Setsuo Hotani, Kaiso-gun (JP)

(73) Assignee: Hotani Co., Ltd., Wakayama-ken (JP)

( * ) Notice: Subject to any disclaimer, the term of this patent is extended or adjusted under 35 U.S.C. 154(b) by 351 days.

(21) Appl. No.: 11/066,230

(22) Filed: Feb. 25, 2005

(65) Prior Publication Data

US 2006/0191417 A1  Aug. 31, 2006

(51) Int. Cl.
*B01D 19/02* (2006.01)

(52) U.S. Cl. .......................... 96/177; 95/242
(58) Field of Classification Search .............. 96/177, 96/178, 214, 217; 95/242, 261
See application file for complete search history.

(56) References Cited

U.S. PATENT DOCUMENTS 4,110,089 A * 8/1978 Muller ..................... 96/177
4,139,350 A * 2/1979 Sotirianos ................. 95/242
5,143,525 A * 9/1992 Sotirianos ................. 95/242

FOREIGN PATENT DOCUMENTS

JP          11-9903          1/1999

* cited by examiner

*Primary Examiner*—Duane Smith
*Assistant Examiner*—Douglas J. Theisen
(74) *Attorney, Agent, or Firm*—Wenderoth, Lind & Ponack, L.L.P.

(57) ABSTRACT

A defoaming apparatus comprises, in juxtaposition, a defoaming treatment chamber internally provided with a defoaming unit for defoaming, as a result of a rotation of a impeller in a casing having a suction port and discharge ports, by suctioning foam of a foaming liquid via the suction port of the casing and colliding the suctioned foam against an inner circumferential surface of the casing by centrifugal force of the impeller and a substantially closed-type tank for housing a foaming liquid, wherein the suction port of the defoaming unit is located in a foam phase region of the tank.

6 Claims, 4 Drawing Sheets

DEFOAMING APPARATUS

BACKGROUND OF THE INVENTION

1. Field of the Invention

The present invention relates to a defoaming apparatus for a foaming liquid, for example, an alkaline liquid after washing strips or the like, and specifically, it relates to a defoaming apparatus for defoaming by suctioning foam of a foaming liquid via a suction port of a casing by a rotation of an impeller in the casing and scattering the same by centrifugal force to collide against the inner circumferential surface of the casing.

2. Background Art

Priorly, as an apparatus for defoaming a foaming liquid by such a method, one as disclosed in Japanese Published Unexamined Patent Application No. H11-9903 has been known.

This prior art is for housing a foaming liquid in an open-type tank and defoaming foam of the foaming liquid by a defoaming unit provided on the tank. Illustration of an outline of the defoaming method is as shown in FIG. 7. In FIG. 7, A denotes a defoaming unit, and B denotes a foaming liquid housing tank. The defoaming unit A is provided with a casing C and an impeller D. E denotes a suction tube of the casing C in the defoaming unit A, F denotes a motor of the impeller D, and G denotes a discharge port of the casing C.

When the impeller D of the defoaming unit A is driven, air is suctioned into the casing C from the suction tube E and is discharged via the discharge ports G. In accordance therewith, foam on the liquid level of a foaming liquid in the tank B is suctioned into a casing C through the suction tube E. The suctioned foam is, by centrifugal force by a rotation of the impeller D, collided against the inner circumferential surface of the casing C and deformed. Liquid droplets generated by this defoaming fall from the discharge ports G into the tank B.

The tank B for housing a foaming liquid is an open type, and an inlet of the suction tube E is opened in a foam phase on the foaming liquid level in the tank B.

According to this prior art, an air flow produced by a rotation of the impeller D of the defoaming unit A is merely circulating in a relatively small region as shown by arrows in FIG. 7, therefore, a sufficient foam suctioning efficiency, that is, a sufficiently excellent defoaming efficiency cannot be expected. This is also apparent from the addition of modification such that the suction tube E is provided in plurality for the defoaming unit A, the suction tube E is made movable on the liquid level of the tank B, or foam on the liquid level of the tank B is raked up to the suction port of the suction tube by a scraper.

SUMMARY OF THE INVENTION

It is an object of the present invention to eliminate the problems of the prior art, enable efficiently defoaming a foaming liquid by the method as described above, and moreover, make it possible to achieve the same by a small-sized simple apparatus.

In order to solve the problems, for a defoaming apparatus of the present invention, a defoaming treatment chamber internally provided with a defoaming unit for defoaming, as a result of a rotation of a impeller in a casing having a suction port and discharge ports, by suctioning foam of a foaming liquid via the suction port of the casing and colliding the suctioned foam against an inner circumferential surface of the casing by centrifugal force of the impeller and a substantially closed-type tank for housing a foaming liquid are provided in juxtaposition, wherein the suction port of the defoaming unit is located in a foam phase region of the tank.

According to the present invention, a foam phase of a foaming liquid in the tank for housing a foaming liquid (hereinafter and in the drawings, the said tank may be referred to as a foaming liquid housing tank for the sake of convenience) is defoamed by the defoaming unit(s) in the defoaming treatment chamber while being confined in a substantially closed space, therefore, into the suction port of the defoaming unit, substantially, outside air is not suctioned but only foam and air of the foam phase region to be defoamed are suctioned. Accordingly, the foam to be defoamed is efficiently defoamed.

As such, the concept of providing a defoaming treatment for the foam phase of a foaming liquid in the foaming liquid housing tank while confining the same in the closed space is embodied by that the system for treating a foaming liquid is provided as a composite construction of a system of the tank for housing a foaming liquid and a system of the defoaming treatment chamber internally provided with a centrifugal defoaming unit(s) whose suction port is located at a predetermined position for defoaming foam of a foaming liquid.

In the present invention, when the substantially closed-type foaming liquid housing tank and the foaming treatment chamber internally provided with a centrifugal defoaming unit(s) are provided in juxtaposition, a suction port of this defoaming unit of the treatment chamber is located in a foam phase region of this tank. For this, juxtaposition of these can be achieved in the form of forming the defoaming treatment chamber in a duct type and loading the same on the foaming liquid housing tank, and embodiment of efficiently defoaming a foaming liquid can be achieved by an application of a small-sized simple apparatus.

When the impeller of the defoaming unit is driven via an accelerating transmission mechanism by a motor, a foam suctioning effect and a defoaming effect are further improved by an accelerating rotation of the impeller of the defoaming unit. In addition, as in an embodiment to be described later, it is possible to form the defoaming treatment chamber in a horizontally long duct type, install a plurality of centrifugal defoaming units inside the same, and drive impellers of these defoaming units via an accelerating transmission mechanism by a single motor.

DESCRIPTION OF THE PREFERRED EMBODIMENTS

Figure 1:
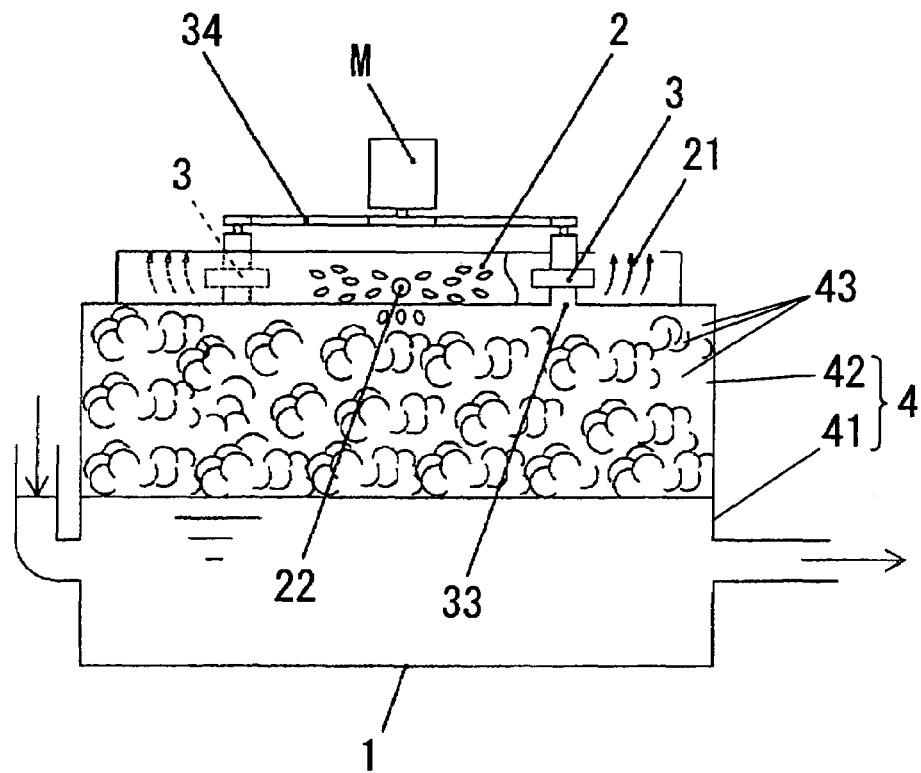
FIG. 1 is an elevation view showing, by a sectional structure, an example of a defoaming apparatus according to the present invention.

An embodiment of the present invention will be described along with an example with reference to the drawings. Here, an embodiment to be described below is merely a concrete example of the present invention and shall not limit the technical scope of the present invention. In the drawings, reference numeral 1 denotes a foaming liquid housing tank, and reference numeral 2 denotes a treatment chamber to defoam foam of a foaming liquid. The foaming liquid housing tank 1 is substantially a closed type, and the defoaming treatment chamber 2 (hereinafter, referred to as a treatment chamber 2) is a horizontally long duct type. In the tank 1, a foaming liquid 4 such as an alkaline liquid after washing strips is housed, for example. The tank 1 and treatment chamber 2 are juxtaposed with an arrangement of the treatment chamber 2 on the top of the tank 1.

A defoaming unit 3 is equipped inside the treatment chamber 2. The treatment chamber 2 has an air discharge port 21 at a position adjacent to the defoaming unit 3. The defoaming unit 3 is provided with a casing 31, an impeller 32 provided in the casing 31, a suction port 33 opened at a bottom central portion of the casing 31, and discharge ports 36 opened at a bottom peripheral portion of the casing 31.

As a result of the impeller 32 rotating in the casing 31, the defoaming unit 3 suctions foam 43 of a foaming liquid 4 from the suction port 33 of the casing 31 and collides the same against the inner circumferential surface of the casing 31 by centrifugal force for defoaming. Air discharged from the discharge ports 36 of the defoaming unit 3 is discharged from the air discharge port 21 of the defoaming treatment chamber 2 outside the treatment chamber 2.

Figure 2:
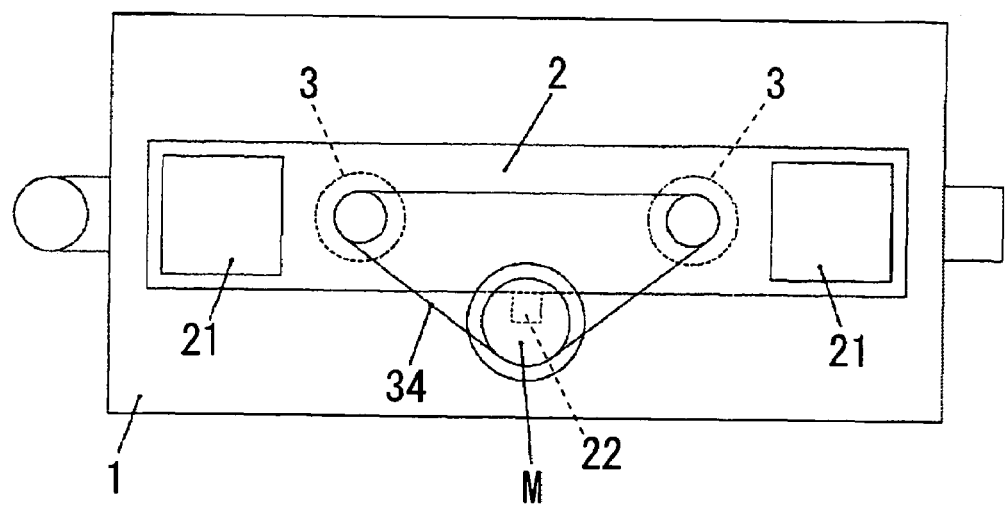
FIG. 2 is a plan view of the defoaming apparatus shown in FIG. 1.
Figure 3:
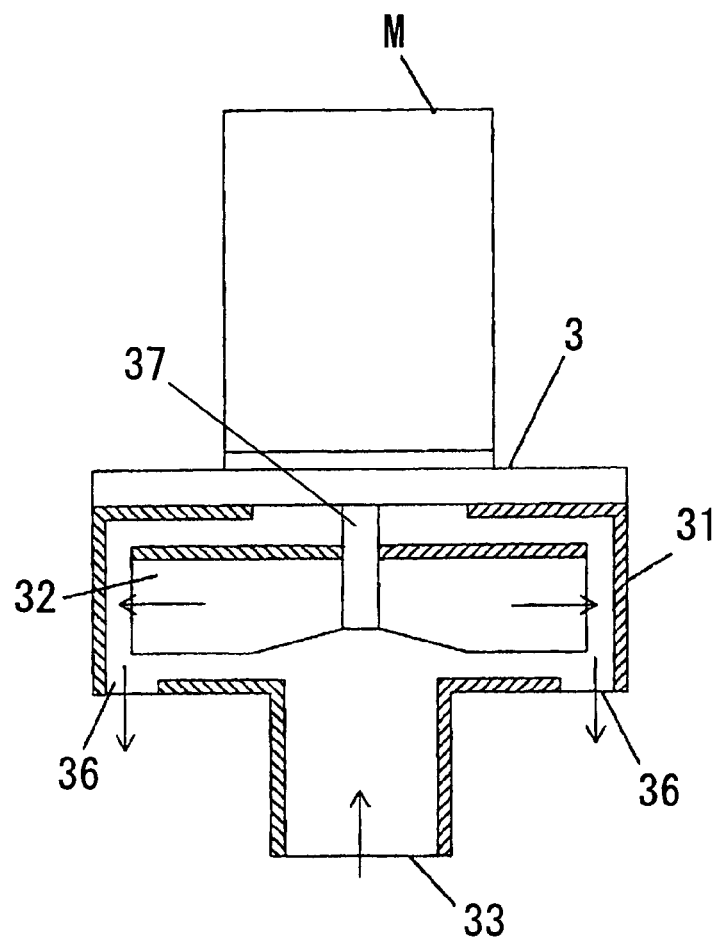
FIG. 3 is an elevation view with a partial section showing an example of a motor drive of a defoaming unit according to the present invention.

The impeller 32 is driven by a motor M. Motor drive of the impeller 32 may be by a direct-coupled method directly coupled to a driving shaft 37 of the motor M as shown in FIG. 3, or may be by an indirect method via a transmission mechanism 34 as shown in FIG. 1 and FIG. 2. For the transmission mechanism 34, a mechanism of an endless belt type or an endless chain type can be employed.

The defoaming unit 3 may be equipped singly or in plurality per one treatment chamber 2. With plural equipment, it is satisfactory that the impellers 32 of the plurality of defoaming units 3 are driven by a single motor M via a transmission mechanism by an endless belt or endless chain (see FIG. 1 and FIG. 2). When motor drive of the impellers 32 is by an indirect method, it is sufficient to assign an accelerating transmission mechanism to the transmission mechanism 34 thereof.

The suction port 33 of the defoaming unit 3 in the defoaming treatment chamber 2 is located in a foam phase region 42 of the substantially closed-type tank 1. This construction brings about defoaming foam of a foaming liquid in the tank 1 by the defoaming unit 3 in the treatment chamber 2 while confining the foam in the substantially closed space. Accordingly, into the suction port 33 of the defoaming unit 3, substantially, outside air is not suctioned but the foam 43 to be defoamed is efficiently suctioned, whereby a sufficiently high defoaming efficiency can be obtained.

Figure 4:
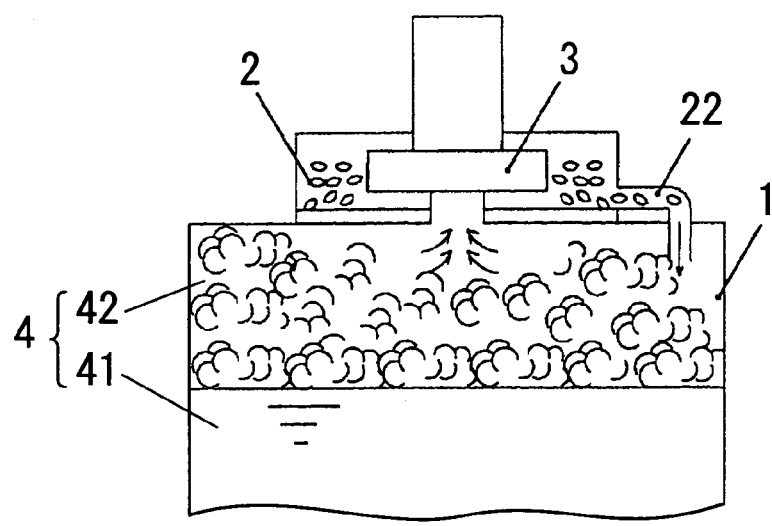
FIG. 4 is an elevation view showing, by a sectional structure, another example different from the example of FIG. 1 in a form discharging liquid droplets generated by a defoaming treatment of the present invention outside the defoaming treatment chamber.
Figure 5:
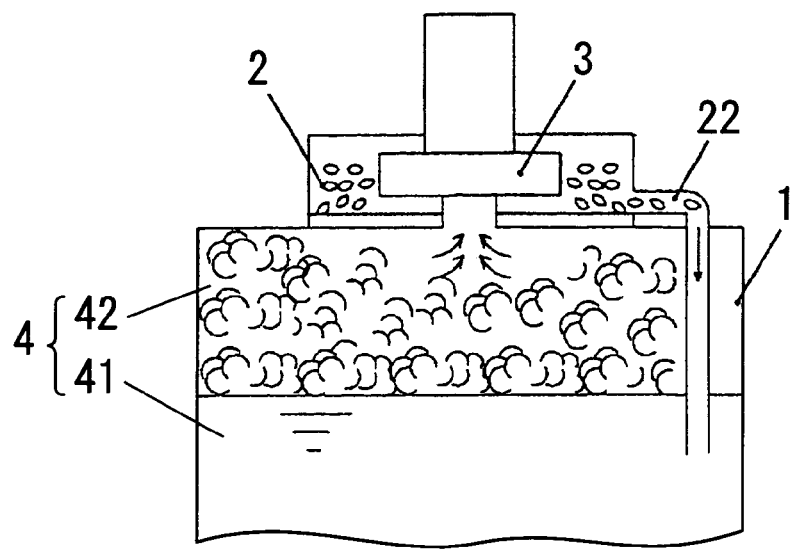
FIG. 5 is an elevation view showing, by a sectional structure, still another example in a form discharging liquid droplets generated by a defoaming treatment of the present invention outside the defoaming treatment chamber.
Figure 6:
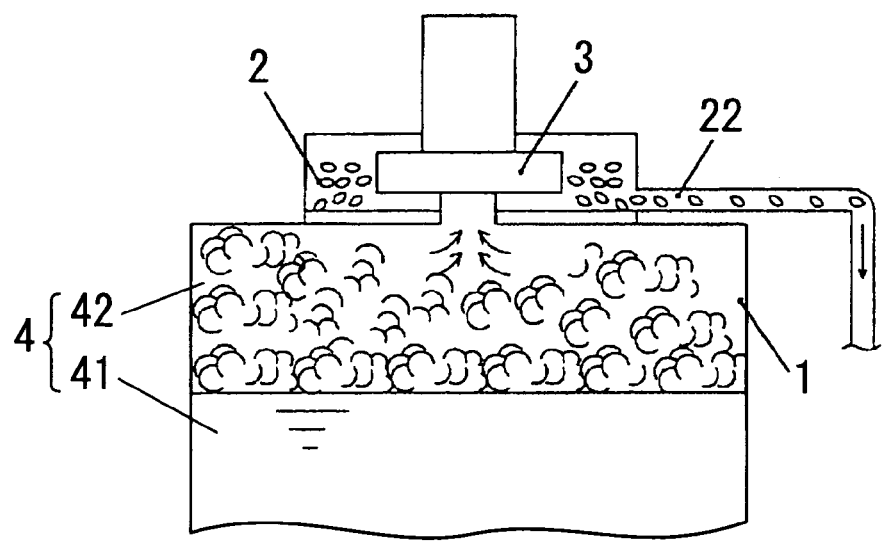
FIG. 6 is an elevation view showing, by a sectional structure, still another example in a form discharging liquid droplets generated by a defoaming treatment of the present invention outside the defoaming treatment chamber.
Figure 7:
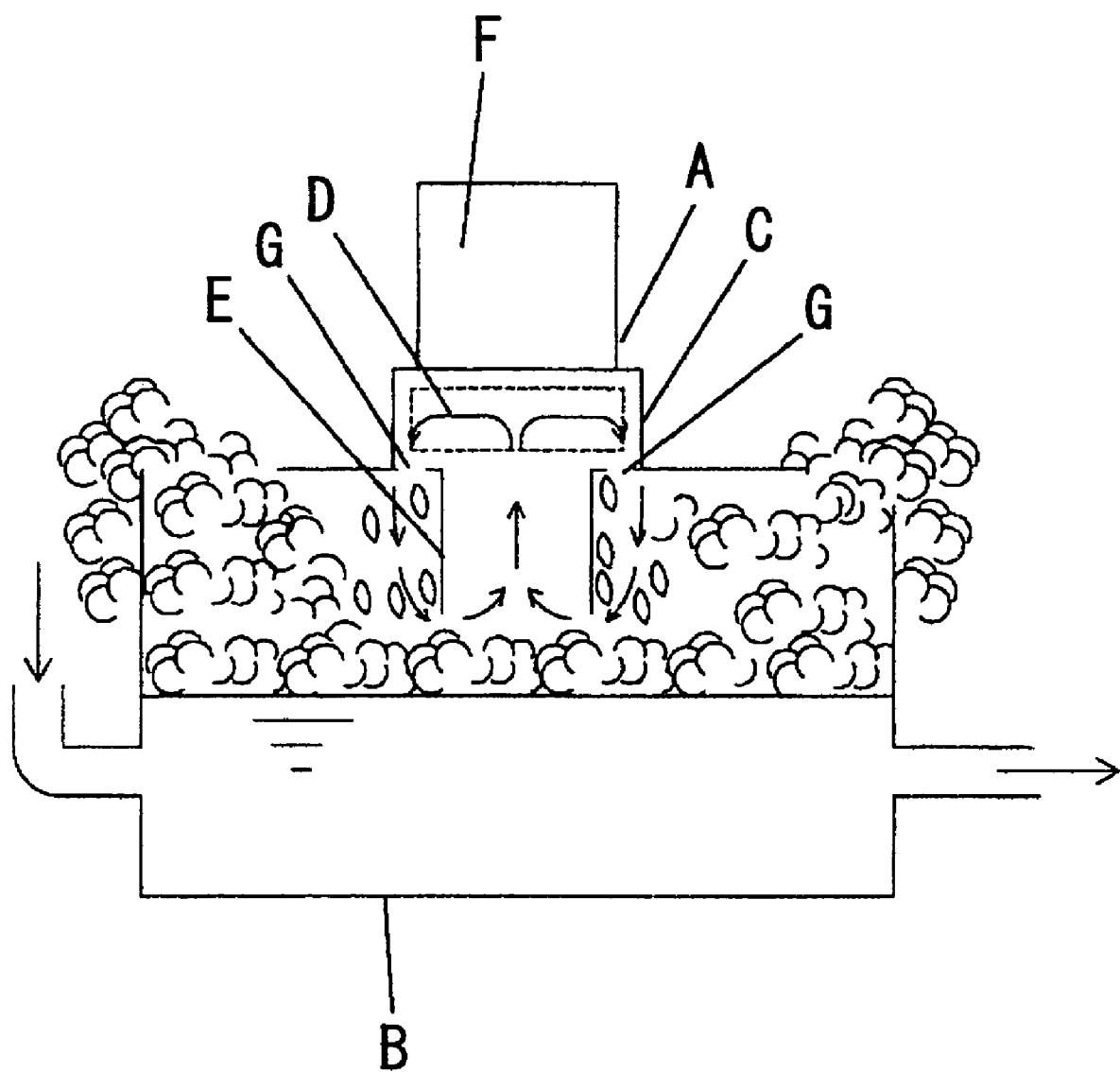
FIG. 7 is an explanatory view of a prior art.

Liquid droplets generated as a result of defoaming by the defoaming unit 3 are discharged from the discharge ports 36 of the defoaming unit, fall to the bottom of the treatment chamber 2, and exit outside the treatment chamber 2 via a liquid discharge port 22 of the treatment chamber 2. A port end of the liquid discharge port 22 may be located at a position of a foam phase region 42 of the foaming liquid 4 in the foaming liquid housing tank 1 (FIG. 4), may reach a liquid phase region 41 of the foaming liquid 4 in the tank 1 (FIG. 5), or may be extended to a position outside the tank 1 (FIG. 6). The liquid droplets generated by defoaming in the aforementioned treatment chamber 2 are, in the first (FIG. 4) and second (FIG. 5) forms of the port end position of the liquid discharge port 22, collected by the tank 1, and are, in the third form, gathered in another tank or position. The third form is favorable for appropriating liquid droplets generated in the treatment chamber 2 for preparation of a strip washing alkaline liquid or subjecting the same to an appropriate treatment such as disposal.

The present invention is carried out by such an embodiment as described above and provides effects shown in the following. Defoaming of a foaming liquid by the method as described at the outset can be efficiently carried out. Moreover, this can be achieved by applying a small-sized simple apparatus.

What is claimed is:

1. A defoaming apparatus comprising, in juxtaposition, a defoaming treatment chamber internally provided with a defoaming unit for defoaming, as a result of a rotation of an impeller in a casing having a suction port and discharge ports, by suctioning foam of a foaming liquid via the suction port of the casing and colliding the suctioned foam against an inner circumferential surface of the casing by centrifugal force of the impeller and a substantially closed-type tank for housing a foaming liquid, wherein the suction port of the defoaming unit is located in a foam phase region of the tank.

2. The defoaming apparatus as set forth in claim 1, wherein the defoaming treatment chamber is formed in a duct type, and the treatment chamber is loaded on the foaming liquid housing tank.

3. The defoaming apparatus as set forth in claim 2, wherein the duct-type defoaming treatment chamber is formed horizontally long, and a plurality of defoaming units are installed inside the defoaming treatment chamber.

4. The defoaming apparatus as set forth in claim 1, wherein the impeller of the defoaming unit is constructed so as to be driven by a motor via an accelerating transmission mechanism.

5. The defoaming apparatus as set forth in claim 2, wherein the impeller of the defoaming unit is constructed so as to be driven by a motor via an accelerating transmission mechanism.

6. The defoaming apparatus as set forth in claim 3, wherein the impellers of the defoaming units are constructed so as to be driven by a motor via an accelerating transmission mechanism.

* * * * *